US 6,634,458 B2

(12) United States Patent
Adamson

(10) Patent No.: US 6,634,458 B2
(45) Date of Patent: Oct. 21, 2003

(54) SOUNDPROOFING SYSTEM

(76) Inventor: Dennis R. Adamson, P.O. Box 15322, Scottsdale, AZ (US) 85267

( * ) Notice: Subject to any disclaimer, the term of this patent is extended or adjusted under 35 U.S.C. 154(b) by 0 days.

(21) Appl. No.: 10/103,233

(22) Filed: Mar. 20, 2002

(65) Prior Publication Data

US 2003/0178249 A1 Sep. 25, 2003

(51) Int. Cl.$^7$ ................................................ E04B 9/00
(52) U.S. Cl. ...................................................... 181/285
(58) Field of Search ................................ 181/285, 284, 181/290, 291, 294, 295, 296, 203, 208

(56) References Cited

U.S. PATENT DOCUMENTS

| | | | | |
|---|---|---|---|---|
| 4,192,116 A | * | 3/1980 | Kelly | 52/469 |
| 4,766,028 A | * | 8/1988 | Rich | 442/58 |
| 5,704,178 A | * | 1/1998 | Ciao | 52/309.1 |
| 6,077,613 A | * | 6/2000 | Gaffigan | 428/442 |

* cited by examiner

Primary Examiner—Shih-Yung Hsieh
(74) Attorney, Agent, or Firm—Tod R. Nissle, P.C.

(57) ABSTRACT

A new system for soundproofing floors utilizes a laminate material having a thickness that is 50% less than conventional asphalt soundproofing material but which has better sound reducing properties than the asphalt soundproofing material. The new system does not require the use of solvents inherent in conventional soundproofing systems, and, accordingly, results in significant reductions in the cost of labor incurred to install the system. The new system utilizes a laminate consisting of uncured rubber, particular embedded in the uncured rubber, and a fabric mesh.

3 Claims, 3 Drawing Sheets

SOUNDPROOFING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION (1) Field of the Invention

This invention relates to apparatus and methods for attenuating sound.

More particularly, the invention relates to a sound attenuation system installed on the upper floor of a building structure to reduce the volume of sound which travels from beneath the floor, through the floor, and into the living space above the floor.

In a further respect, the invention relates to a sound attenuation system of the type described which—in comparison to similar existing systems—employs materials that typically cost less, which requires less expense and labor to install, and which attenuate sound to a greater degree.

(2) Description of the Related Art Including Information Disclosed Under 37 CFR 1.97 and 1.98

In buildings including two or more stories, it is common practice to include sound attenuating material on upper floors. The sound attenuating material minimizes the volume of sound traveling upwardly from a room under an upper floor, through the upper floor, and into the room above the upper floor. Sound attenuating material functions by reflecting sound waves, absorbing sound waves, and/or disrupting sound waves. Conventional sound absorbing material comprises sheets of cork, asphalt, or other materials. The asphalt is typically about eighty percent tar, the remainder including clay, solvents, and other fillers. One disadvantage of asphalt is that with time, it tends to harden. It also hardens in cold weather. When the asphalt hardens, it tends to crack if the floor expands or contracts, or if a crack develops in the floor. Another disadvantage of asphalt is that prior to applying asphalt to a floor, a solvent must be applied. The solvent softens the asphalt and causes it to stick to the floor. Similarly, to apply cork, a mastic or adhesive must be utilized to cause the cork to adhere to the floor. Since cork comprises a matrix of particles pressed together, the cork also tends to develop cracks if a crack in the floor develops, or if the floor expands or contracts.

Accordingly, it would be highly desirable to provide a sound proofing system which did not require the use of an adhesive or solvent to apply a sound attenuating material, which would expand and contract with a floor, and which would not develop cracks when a crack developed in the floor supporting the sound proofing system.

Therefore, it a principal object of the invention to provide an improved sound attenuating system and method of installing the same on the upper floor of a building structure.

A further object of the invention is to provide an improved sound attenuating system which expands and contracts with the floor on which the system is applied.

Another object of the invention is to provide an improved sound attenuating system which can be applied directly to the upper floor of a building structure without pretreating the floor with a solvent or adhesive.

Still a further object of the invention is to provide an improved elastomeric sound attenuation system which remains pliable over extended periods of time.

BRIEF DESCRIPTION OF THE SEVERAL VIEWS OF THE DRAWING(S)

These and other, further and more specific objects and advantages of the invention will apparent to those skilled in the art from the following detailed description thereof, taken in conjunction with the drawings, in which.

BRIEF SUMMARY OF THE INVENTION

Briefly, in accordance with the invention, I provide an improved method for attenuating sound in a building structure. The building structure includes at least one upper floor. The method includes the steps of obtaining a sheet of an uncured sticky elastomeric material having a first side and a second side spaced apart from and opposing the first side; obtaining a sheet of backing material peelable from the first side when applied thereto; applying the sheet of backing material to the first side; obtaining a fabric layer; applying the fabric layer to the second side; the elastomeric sheet, sheet of backing material, and fabric layer collectively forming an elastomeric laminate; transporting the elastomeric laminate to the building structure; selecting a surface on the upper floor in the building structure; removing the sheet of backing material from the first side; applying the first side directly to the surface on the upper floor; and, applying flooring to the fabric layer.

In another embodiment of the invention, I provide an improved method for attenuating sound in a building structure. The building structure includes at least one upper floor. The method includes the steps of obtaining a sheet of an uncured sticky elastomeric material having a first side and a second side spaced apart from and opposing the first side; obtaining a fabric layer; applying the fabric layer to the second side; the elastomeric sheet and fabric layer collectively forming an elastomeric laminate; transporting the elastomeric laminate to the building structure; selecting a surface on the upper floor in the building structure; applying the first side directly to the surface on the upper floor; and, applying flooring to the fabric layer.

In another embodiment of the invention, I provide an improved method for attenuating sound in a building structure. The building structure includes at least one upper floor. The method includes the steps of obtaining a plurality of strips of an uncured sticky rubber material each having a first side and a second side spaced apart from and opposing the first side; obtaining a plurality of fabric layers; applying each fabric layer to the second side of one of said strips of elastomeric material; each elastomeric strip and fabric layer collectively forming an elastomeric laminate strip; transporting the elastomeric laminate strips to the building structure; selecting a surface on the upper floor in the building structure; applying the first side of each elastomeric laminate strip directly to the surface on the upper floor in overlapping relationship; and, applying flooring to the fabric layers.

DETAILED DESCRIPTION OF THE INVENTION

Figure 1:
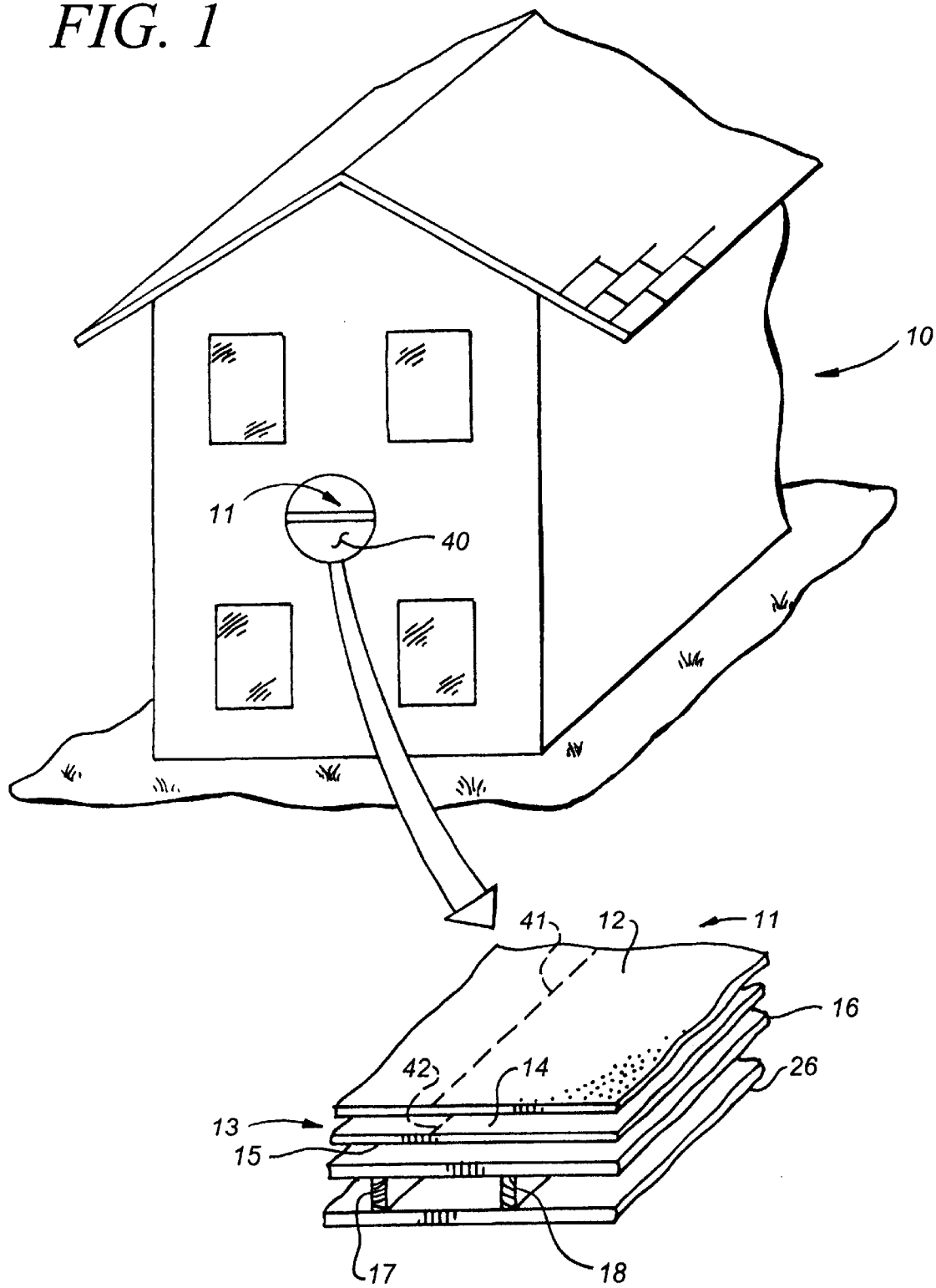
FIG. 1 is a perspective view illustrating a building structure with a portion of the upper floor thereof enlarged to display a sound attenuation system constructed in accordance with the invention installed thereon.

Turning now to the drawings, which describe the presently preferred embodiments of the invention for the purpose of describing the operation and use thereof and not by way of limitation of the scope of the invention, and in which like reference characters refer to corresponding elements throughout the several views, FIG. 1 is a perspective view of a building structure 10 including at least one upper floor 11. A sound attenuation system constructed in accordance with the invention is included on upper floor 11 to attenuate sound traveling upwardly from the space 40 in the room beneath floor 11.

The building structure can comprise a residence, a commercial building, a warehouse or another building in which individuals live or work.

Floor 11 includes, in conventional fashion, plywood sheet 16 nailed or otherwise fastened to the top of two-by-fours 17, 18 or other horizontally oriented joists or supports. Sheet rock 26 is fastened to the bottom of two-by-fours 17, 18 and forms the ceiling of the basement or other room which is beneath floor 11. As is well known, concrete or any other desired building material can be utilized in place of plywood, two-by-fours, and/or sheet rock 26.

Soundproofing material is applied to floor 11 and comprises a sheet 13 of uncured elastic sticky rubber material including about 64% by weight of a mixture of uncured butyl-isoprene rubber and styrene-butadiene rubber, 33.4% by weight of calcium carbonate particle filler, and 2.6% by weight crystalline silica particle filler. Since the rubber is uncured (i.e., has not been heated and baked) it is unusually sticky, and readily bonds to many surfaces, including most, if not all, floor surfaces like wood, tile, concrete, etc. Sheet 13 includes a generally flat upper surface 14 opposed to and spaced apart from a generally flat lower surface 15. One reason surface 15 of sheet 13 readily adheres to a floor surface is that surface 15 ordinarily, but not necessarily, is a continuous flat, smooth surface with few, if any, indentations or holes formed in surface 15. Further, if a floor 16 surface has depressions or upraised areas, elastic surface 15 tends to conform and adhere to such depressions and upraised areas such that surface 15 is adhering to floor 16 at the great majority of points on surface 15. Such a smooth, continuous adherence of surface 15 to floor 16 is believed, or hypothesized, to be one of the reasons for the unexpected soundproofing qualities of the soundproofing system of the invention.

The weight percent of rubber or other sticky elastomer in the sheet 13 of elastomer material can vary as desired, but is in the range of 40% to 95% by weight, preferably 50% to 80% by weight. The use of a large weight percent of uncured rubber is critical in the practice of the invention because the rubber automatically sticks to a floor surface without requiring the use of a solvent or mastic, because the rubber is elastic, because the rubber retains its elasticity for long periods of time typically in excess of twenty years or more, and because the rubber retains its elasticity at freezing temperatures. While any sticky elastomer can be utilized in the practice of the invention, natural latex rubber, butyl-isoprene rubber, styrene-butadiene rubber, and other rubbers are presently preferred.

The weight percent of particle filler in sheet 13 is in the range of 5% to 60%, preferably 20% to 50% by weight. The width of each particle is in the range of 0.001 inch to 2.00 inches, preferably 0.01 to 1.00 inch. As used herein, the term width means the greatest dimension of a particle. For example, if a particle is a fiber that is one inch long and 0.1 inch wide, then the "width" of the fiber is one inch. If the particle is spherical and has a diameter of 0.2 inch, then the "width" of the particle is 0.2 inch. If a particle is elliptical and the long axis of the particle is 0.3 inch and the short axis of the particle is 0.25 inch, then the "width" of the particle is 0.3 inch. If a particle has an irregular shape and the greatest width of the particle is 0.12 inch, then the "width" of the particle is 0.12 inch.

The particle filler material is believed, or hypothesized, to disrupt or deflect sound waves, although specific tests have not been performed to confirm such. It is believed this is one of the reasons that the soundproofing laminate of the invention has unexpected and surprising soundproofing abilities. Any desired filler can be utilized, but it is preferred that the filler not adversely affect the elasticity and adherence qualities of the rubber in the material. While calcium carbonate and silica particle fillers are presently preferred, any desired fillers can be utilized in sheet 13.

Figure 2:
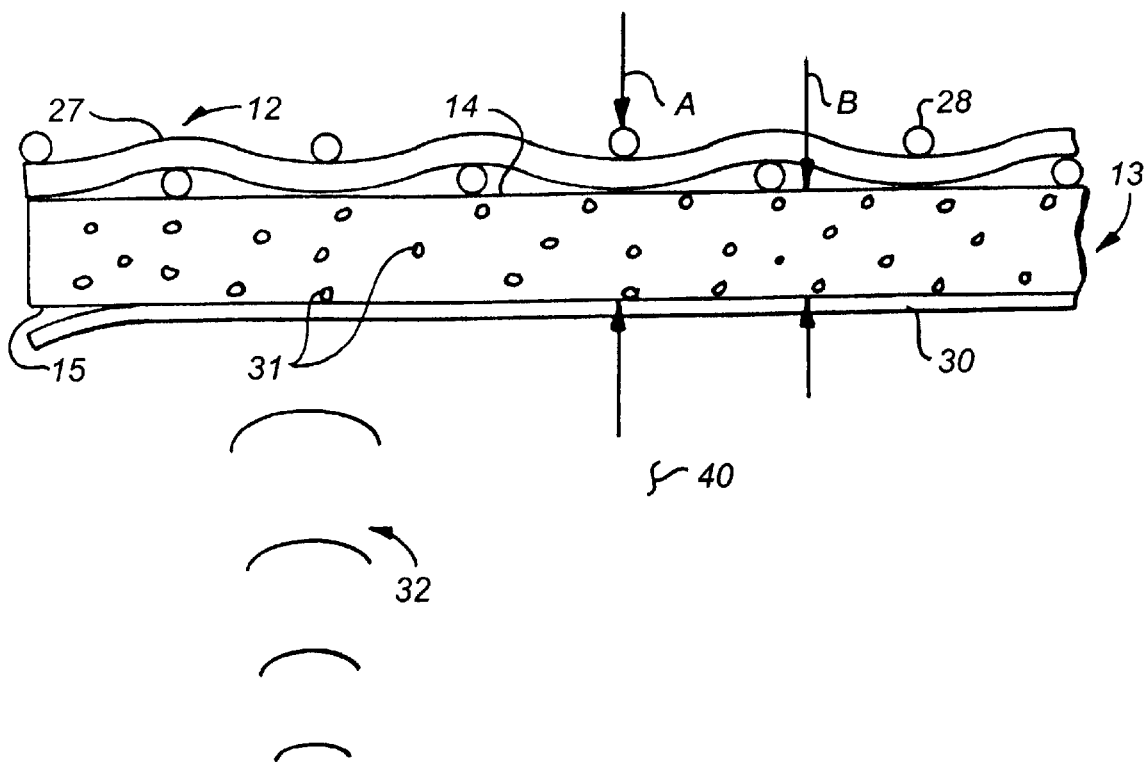
FIG. 2 is a side section view illustrating an elastomeric laminate sheet used in the sound attenuation system of the invention; and, FIG. 3 is a block flow diagram illustrating a method for installing a sound attenuation system in accordance with the invention.

A fabric sheet or layer 12 is attached to top surface 14 of elastic sheet 13. The fabric sheet 12 is preferably, although not necessarily, comprised of a dense, heavy stitched fabric because mastic is applied to sheet 12 to attach and anchor tile or other floor coverings to sheet 12. Sheet 12 is also believed to assist in attenuating sound passing through sheet 12. Upper surface 14 adheres to sheet 12 and maintains sheet 12 in fixed position adjacent surface 14. As shown in FIG. 2, sheet 12 can comprise woven threads 27, 28. Sheet 12 is typically, although not necessarily, comprised of artificial hydrophilic threads or strands of fabric such a nylon, rayon, etc.

The thickness, indicated by arrows A in FIG. 2, of layer 12 and sheet 13 can vary, but is presently about 0.37 inch. This is about 50% less than the thickness of asphalt sheets currently applied to floors to provide sound attenuation. Even though the thickness of the laminate sheet utilized in the invention is less than the thickness of a conventional asphalt sheet, the sound impact/insulation ratio of layer 12 and sheet 13 is 71/71, which is unexpectedly and surprisingly significantly better than the ratio of 55/61 found in conventional asphalt sheets. The thickness of layer 12 and sheet 13 is preferably in the range of 0.1 inch to 0.75 inch, most preferably 0.25 inch to 0.50 inch.

A backing layer 30 is applied to the bottom surface 15 of sheet 13. While layer 30 can, if desired, be omitted, layer 30 often is a necessity practically speaking because sheet 13 is typically rolled prior to being transported. Layer 30 presently preferably comprises a pliable plastic or other polymer or other material which can be readily peeled off and separated from surface 15 without removing any of the material comprising surface 15.

Figure 3:
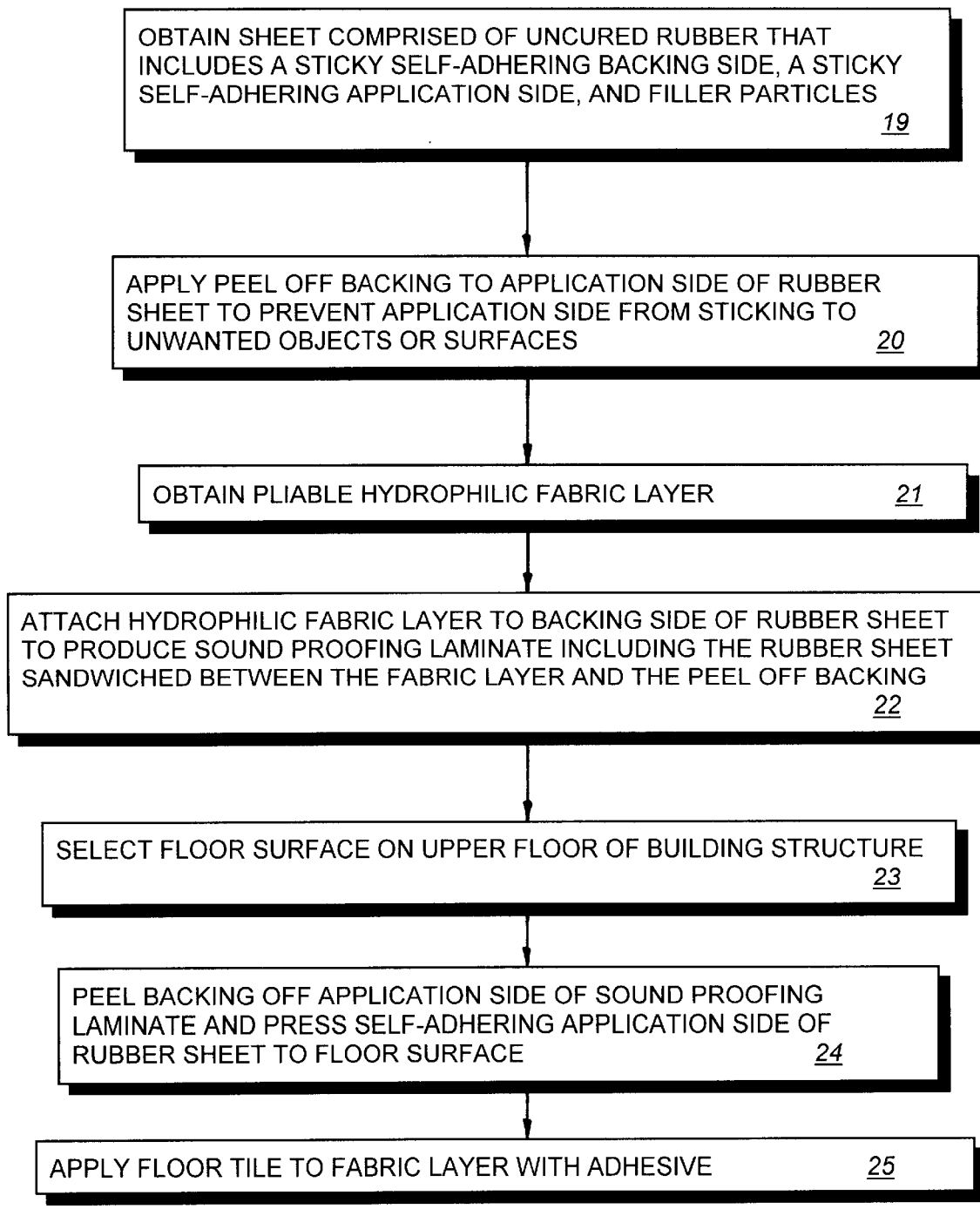

FIG. 3 is provided to illustrate, without limiting the scope of the invention, a method of employing the sound insulation system of the invention. In step 19, a sheet of uncured rubber material is obtained. The sheet includes a sticky self-adhering backing side 14, a sticky self-adhering application side 15, and filler particles 31. In step 20, a peel-off backing 30 is applied to the application side 15 of the sheet to prevent the application side from sticking to unwanted objects or surfaces. In step 21, a pliable hydrophilic fabric layer 12 is obtained. A hydrophilic layer is preferred, although not required, because it repels water. In step 22, the hydrophilic fabric layer is applied to the backing side of the rubber sheet. A sound proofing elastomeric laminate is produced which includes the rubber sheet 13 sandwiched between the fabric layer 12 and the peel-off backing 30. In step 23, a floor surface is selected on the upper floor 16 of a building structure. The floor surface preferably is clean and dry, as is normally the case when any supplemental flooring material is to be applied to the floor surface. The floor surface is free of any solvent or adhesive. The backing material 30 is, in step 24, peeled off the self-adhering application side (bottom surface 15) of sheet 13 and the sheet 13 is applied directly to the plywood surface of floor 16. The application side adheres to the surface of floor 16. Tile or other flooring is applied to fabric layer 12 with mastic or another adhesive or fastening material.

Layer 12, sheet 13, and backing 30 typically are provided in rolled up rectangular strips. A first strip is applied to a floor surface by unrolling the strip, peeling off the backing 30, and pressing side 15 against the floor surface. A second strip is applied parallel to the first strip in similar fashion such that one edge of the second strip overlaps an edge of the first strip. The third strip is applied parallel to the second strip such that one edge of the third strip overlaps an edge of the second strip, and so on. This overlapping of strips at the juncture 41, 42 between the strips is important in the practice of the invention. If abutting strips do not overlap, but instead simply meet along their edges, sound can more readily penetrate through any space that exists between the edges of abutting strips.

Similarly, along the baseboards at the bottom of each wall in an upper room, it is preferred that layer 12 and sheet 13 extend beneath the baseboard or extend and bend from the floor continuously up the vertical face of the baseboard for a short distance, typically one or two inches. This limits the quantity of sound that can travel from below, pass between the edge of a strip and the baseboard and into the upper room. Or, if an edge of layer 12 and sheet 13 ends at the baseboard, caulk can be applied at the edge—baseboard junction.

Having described my invention is such terms as to enable those skilled in the art to understand and practice it and having described the presently preferred embodiments and best mode thereof.

I claim:

1. A method for attenuating sound in a building structure including at least one upper floor, comprising the steps of
   (a) obtaining a sheet of an uncured sticky elastomeric material having a first side and a second side spaced apart from and opposing said first side;
   (b) obtaining a sheet of backing material peelable from said first side when applied thereto;
   (c) applying said sheet of backing material to said first side;
   (d) obtaining a fabric layer;
   (e) applying said fabric layer to said second side, said elastomeric sheet, sheet of back material, and fabric layer collectively forming an elastomeric laminate;
   (f) transporting said elastomeric laminate to said building structure;
   (g) selecting a surface on said upper floor in said building structure;
   (h) removing said sheet of backing material from said first side;
   (i) applying said first side directly to said surface on said upper floor; and,
   (j) applying flooring to said fabric layer.

2. An improved method for attenuating sound in a building structure including at least one upper floor, the method comprising the steps of
   (a) obtaining a sheet of an uncured sticky elastomeric material having a first side and a second side spaced apart from and opposing said first side;
   (b) obtaining a fabric layer; applying said fabric layer to said second side, said elastomeric sheet and said fabric layer collectively forming an elastomeric laminate;
   (c) transporting said elastomeric laminate to the building structure;
   (d) selecting a surface on said upper floor in the building structure;
   (e) applying said first side directly to said surface on said upper floor; and,
   (f) applying flooring to said fabric layers.

3. A method for attenuating sound in a building structure including at least one upper floor, comprising the steps of
   (a) obtaining a plurality of strips of an uncured sticky rubber material each having a first side and a second side spaced apart from and opposing the first side;
   (b) obtaining a plurality of fabric layers;
   (c) applying each fabric layer to said second side of one of said strips of elastomeric material, each of said elastomeric strips and fabric layer applied thereto collectively comprising an elastomeric laminate strip;
   (d) transporting the elastomeric laminate strips to the building structure;
   (e) selecting a surface on the upper floor in the building structure;
   (f) applying said first side of each elastomeric laminate strip directly to the surface on the upper floor in overlapping relationship; and,
   (g) applying flooring to said fabric layers.

* * * * *